(12) United States Patent
Sjöland et al.

(10) Patent No.: US 12,402,075 B2
(45) Date of Patent: Aug. 26, 2025

(54) WAKE-UP SIGNAL, AND CORRESPONDING TRANSMITTER AND RECEIVER

(71) Applicant: Telefonaktiebolaget LM Ericsson (publ), Stockholm (SE)

(72) Inventors: Henrik Sjöland, Lund (SE); Leif Wilhelmsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 720 days.

(21) Appl. No.: 17/624,701

(22) PCT Filed: Jul. 5, 2019

(86) PCT No.: PCT/EP2019/068130
§ 371 (c)(1),
(2) Date: Jan. 4, 2022

(87) PCT Pub. No.: WO2021/004607
PCT Pub. Date: Jan. 14, 2021

(65) Prior Publication Data
US 2022/0256460 A1 Aug. 11, 2022

(51) Int. Cl.
*H04W 52/02* (2009.01)
*H04L 27/02* (2006.01)
*H04L 27/26* (2006.01)

(52) U.S. Cl.
CPC ......... *H04W 52/0232* (2013.01); *H04L 27/02* (2013.01); *H04L 27/2613* (2013.01)

(58) Field of Classification Search
CPC ............... H04L 27/02; H04L 27/2613; H04W 52/0232; H04W 52/0235; Y02D 30/70
See application file for complete search history.

(56) References Cited

U.S. PATENT DOCUMENTS 5,974,082 A * 10/1999 Ishikawa ............... H04B 7/2618
375/141
7,616,711 B2 * 11/2009 Gore .................... H04L 25/0226
375/350

(Continued)

OTHER PUBLICATIONS

International Search Report and Written Opinion dated Mar. 12, 2020 in International Application No. PCT/EP2019/068130 (9 pages total).

(Continued)

*Primary Examiner* — Dung B Huynh
(74) *Attorney, Agent, or Firm* — Rothwell, Figg, Ernst & Manbeck, P.C.

(57) ABSTRACT

A method for a wake-up transmitter comprises generating a wakeup signal (WUS) from a digital WUS sequence having an information symbol rate and a corresponding information symbol bandwidth, and transmitting the WUS over a frequency range having a signal bandwidth, wherein the signal bandwidth is larger than twice the information symbol rate, and wherein any frequency interval comprised in the frequency range conveys the digital WUS sequence when a width of the frequency interval is at least the information symbol bandwidth. A corresponding method for a wake-up receiver comprises receiving the WUS over the frequency range, and filtering the received WUS through a filter having a filter bandwidth for passing the information symbol bandwidth of the received WUS. Corresponding apparatuses, wake-up transmitter, wake-up receiver, communication device and computer program product are also disclosed.

18 Claims, 4 Drawing Sheets

(56) References Cited

U.S. PATENT DOCUMENTS

| | | | | |
|---|---|---|---|---|
| 7,974,230 | B1* | 7/2011 | Talley | H04W 52/325 |
| | | | | 370/328 |
| 9,357,150 | B2* | 5/2016 | Luo | A61B 1/00 |
| 9,577,855 | B1* | 2/2017 | Sternowski | H04B 1/18 |
| 9,641,813 | B2* | 5/2017 | Bowler | H04N 7/22 |
| 10,015,744 | B2* | 7/2018 | Cherniavsky | H04W 76/12 |
| 10,291,111 | B1* | 5/2019 | Rosado | H02M 7/53873 |
| 11,080,336 | B2* | 8/2021 | Van Dusen | G06N 5/02 |
| 11,366,488 | B1* | 6/2022 | Arora | G06F 1/3237 |
| 11,637,675 | B2* | 4/2023 | Jia | H04L 5/0053 |
| | | | | 370/329 |
| 12,279,204 | B2* | 4/2025 | Liu | H04L 5/0051 |
| 2006/0245514 | A1* | 11/2006 | Ota | H03D 1/24 |
| | | | | 375/321 |
| 2007/0071151 | A1* | 3/2007 | Ebert | H04L 7/046 |
| | | | | 375/354 |
| 2007/0286301 | A1* | 12/2007 | Ohta | H04L 27/2637 |
| | | | | 375/265 |
| 2010/0279653 | A1* | 11/2010 | Poltorak | H04M 15/00 |
| | | | | 455/410 |
| 2012/0300719 | A1* | 11/2012 | Choi | H04L 5/0037 |
| | | | | 370/329 |
| 2013/0010848 | A1* | 1/2013 | Shimizu | H04N 21/43637 |
| | | | | 375/295 |
| 2013/0010849 | A1* | 1/2013 | Shimizu | G09G 5/006 |
| | | | | 375/300 |
| 2013/0094490 | A1* | 4/2013 | Taromaru | H04L 27/26265 |
| | | | | 370/343 |
| 2014/0065982 | A1* | 3/2014 | Suh | H04L 41/0809 |
| | | | | 455/77 |
| 2015/0023659 | A1* | 1/2015 | Sun | H04L 7/027 |
| | | | | 398/34 |
| 2015/0071151 | A1* | 3/2015 | Bradley | H04W 52/0235 |
| | | | | 370/311 |
| 2015/0077226 | A1* | 3/2015 | Lin | H04W 52/0225 |
| | | | | 340/5.72 |
| 2015/0339257 | A1* | 11/2015 | Hug | G06F 1/12 |
| | | | | 710/110 |
| 2016/0015977 | A1* | 1/2016 | Biele | A61N 1/36071 |
| | | | | 607/46 |
| 2016/0028567 | A1* | 1/2016 | Brunin | H04L 25/14 |
| | | | | 370/533 |
| 2016/0080140 | A1* | 3/2016 | Gach | H04L 7/0087 |
| | | | | 375/360 |
| 2016/0173302 | A1* | 6/2016 | Gerdes | H04L 27/10 |
| | | | | 375/295 |
| 2016/0292669 | A1* | 10/2016 | Tunnell | G06Q 20/325 |
| 2016/0330714 | A1* | 11/2016 | Hedayat | H04L 5/0023 |
| 2016/0373237 | A1* | 12/2016 | Shellhammer | H04L 7/0012 |
| 2017/0118059 | A1* | 4/2017 | Santa | H04L 27/2647 |
| 2017/0257125 | A1* | 9/2017 | Das | H03M 1/0629 |
| 2017/0262105 | A1* | 9/2017 | Li | G06F 3/0488 |
| 2017/0332327 | A1* | 11/2017 | Fang | H04L 5/0007 |
| 2018/0007629 | A1* | 1/2018 | Dorrance | H04W 52/0229 |
| 2018/0019902 | A1* | 1/2018 | Suh | H04L 27/26025 |
| 2018/0077217 | A1* | 3/2018 | Choi | H04L 67/02 |
| 2018/0103431 | A1* | 4/2018 | Suh | H04B 1/707 |
| 2018/0184379 | A1* | 6/2018 | Liu | H04W 52/0219 |
| 2018/0227070 | A1* | 8/2018 | Suh | H04L 27/2627 |
| 2018/0295595 | A1* | 10/2018 | Shellhammer | H04W 52/0229 |
| 2018/0302901 | A1* | 10/2018 | Suh | H04L 27/26025 |
| 2018/0309538 | A1* | 10/2018 | Verma | H04L 1/0002 |
| 2018/0332533 | A1* | 11/2018 | Bhattad | H04W 52/0235 |
| 2018/0332549 | A1* | 11/2018 | Bhattad | H04W 56/001 |
| 2019/0082385 | A1* | 3/2019 | Shellhammer | H04L 47/25 |
| 2019/0082390 | A1* | 3/2019 | Azizi | H04L 5/0007 |
| 2019/0089458 | A1* | 3/2019 | Chen | H04J 14/04 |
| 2019/0090189 | A1* | 3/2019 | Story | H04W 52/028 |
| 2019/0116554 | A1* | 4/2019 | Kristem | H04L 27/2675 |
| 2019/0116555 | A1* | 4/2019 | Kristem | H04L 5/0092 |
| 2019/0221946 | A1* | 7/2019 | Kerselaers | H01Q 5/35 |
| 2019/0273647 | A1* | 9/2019 | Shellhammer | H04L 27/2331 |
| 2019/0297575 | A1* | 9/2019 | Seok | H04W 52/0229 |
| 2019/0306797 | A1* | 10/2019 | Azizi | H04L 27/2603 |
| 2019/0306811 | A1* | 10/2019 | Balakrishnan | H04W 52/028 |
| 2019/0357145 | A1* | 11/2019 | Lopez | H04W 52/243 |
| 2019/0372822 | A1* | 12/2019 | Woodsum | H04L 27/3488 |
| 2019/0387469 | A1* | 12/2019 | Wilhelmsson | H04W 52/0229 |
| 2020/0015164 | A1* | 1/2020 | Asterjadhi | H04W 52/0229 |
| 2020/0022082 | A1* | 1/2020 | Ljung | H04J 13/0048 |
| 2020/0045635 | A1* | 2/2020 | Lin | H04W 52/0248 |
| 2020/0073054 | A1* | 3/2020 | Yang | G02B 6/3558 |
| 2020/0092811 | A1* | 3/2020 | Park | H04L 27/04 |
| 2020/0137686 | A1* | 4/2020 | Cao | H04W 52/0235 |
| 2020/0163018 | A1* | 5/2020 | Wilhelmsson | H04W 52/0206 |
| 2020/0177233 | A1* | 6/2020 | Kneissl | H04B 1/7136 |
| 2020/0212941 | A1* | 7/2020 | Wilhelmsson | H04L 27/18 |
| 2020/0235972 | A1* | 7/2020 | Li | H04L 27/2634 |
| 2020/0245137 | A1* | 7/2020 | Chitrakar | H04W 52/0219 |
| 2020/0267651 | A1* | 8/2020 | Wilhelmsson | H04W 52/028 |
| 2020/0274569 | A1* | 8/2020 | Hoshi | H03F 3/24 |
| 2020/0288397 | A1* | 9/2020 | Ahn | H04W 52/02 |
| 2020/0320159 | A1* | 10/2020 | Matthews | C09K 5/10 |
| 2020/0322889 | A1* | 10/2020 | Chitrakar | H04L 27/26 |
| 2021/0014788 | A1* | 1/2021 | Sahin | H04L 27/206 |
| 2021/0022078 | A1* | 1/2021 | Agardh | H04W 76/28 |
| 2021/0188252 | A1* | 6/2021 | Lu | B60W 40/12 |
| 2021/0243064 | A1* | 8/2021 | Limberg | H04L 27/2697 |
| 2021/0368443 | A1* | 11/2021 | Park | H04L 27/26134 |
| 2022/0022166 | A1* | 1/2022 | Zhao | H04L 1/0038 |
| 2022/0046114 | A1* | 2/2022 | Entelis | H04L 67/5651 |
| 2022/0256460 | A1* | 8/2022 | Sjöland | H04L 27/2613 |
| 2022/0256607 | A1* | 8/2022 | Liu | H04W 74/0833 |
| 2022/0264458 | A1* | 8/2022 | Lopez | H04L 27/2613 |
| 2022/0346009 | A1* | 10/2022 | Song | H04W 52/02 |
| 2022/0400455 | A1* | 12/2022 | Garsault | H04W 56/0015 |
| 2023/0073361 | A1* | 3/2023 | Hernandez Canseco | |
| | | | | B61L 23/048 |
| 2023/0074775 | A1* | 3/2023 | Lei | H04W 72/044 |
| 2023/0125343 | A1* | 4/2023 | Vaquero Caballero | |
| | | | | H04B 10/6164 |
| | | | | 398/202 |
| 2023/0148178 | A1* | 5/2023 | Chitrakar | H04W 52/0216 |
| | | | | 713/170 |
| 2023/0189147 | A1* | 6/2023 | Bala | H04W 68/02 |
| | | | | 370/311 |
| 2023/0229224 | A1* | 7/2023 | Shang | G06F 1/3206 |
| | | | | 713/322 |
| 2023/0269614 | A1* | 8/2023 | Chen | H04W 24/08 |
| | | | | 370/252 |
| 2024/0048432 | A1* | 2/2024 | Limberg | H04L 27/3411 |
| 2024/0251343 | A1* | 7/2024 | Kincaid | H04W 52/0203 |
| 2024/0313818 | A1* | 9/2024 | Zhao | G01S 19/32 |
| 2024/0323073 | A1* | 9/2024 | Feng | H04L 27/2605 |
| 2024/0373431 | A1* | 11/2024 | Marinier | H04W 72/232 |
| 2024/0381256 | A1* | 11/2024 | Ye | H04W 52/0216 |
| 2024/0388416 | A1* | 11/2024 | Yu | H04L 12/40013 |
| 2025/0024376 | A1* | 1/2025 | Feng | H04L 5/0007 |

OTHER PUBLICATIONS

IEEE P802.11ba™/D3.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Wake-Up Radio Operation, IEEE P802.11ba/D3.0, May 2019, Piscataway, NJ USA (182 pages total).

Sahin, A. et al., "On OOK Waveform Specification", Mar. 5, 2018, doc: IEEE802.11-18/460r1, Piscataway, NJ USA, XP068125447 (36 pages total).

Sundman, D. et al., "OOK Symbol Design", Jan. 14, 2018, doc: IEEE802.11-18/0143r2, Ericsson, Piscataway, NJ USA, XP068122881 (7 pages total).

Bryant, C. et al., "A 2.45GHZ, 50uW Wake-up Receiver Front-end with -88dBm Sensitivity and 250kbps Data Rate", IEEE, 2014, pp. 235-238 (4 pages total).

(56) References Cited

OTHER PUBLICATIONS

"Audio crossover", Wikipedia, Aug. 8, 2019, https://en.wikipedia.org/wiki/Audio_crossover (6 pages total).

* cited by examiner

WAKE-UP SIGNAL, AND CORRESPONDING TRANSMITTER AND RECEIVER

CROSS REFERENCE TO RELATED APPLICATION

This application is a 35 U.S.C. § 371 National Stage of International Patent Application No. PCT/EP2019/068130, filed Jul. 5, 2019.

TECHNICAL FIELD

The present disclosure relates generally to the field of wireless communication. More particularly, it relates to transmission and reception of wake-up signals for wireless communication.

BACKGROUND

Some wireless communication systems support devices with ultra-low power consumption. Examples of such devices include small sensor nodes where a battery should last many years and/or where energy scavenging is used to achieve battery-less operation.

When the wireless communication systems are to communicate with such devices a receiver needs be active in the device, and to achieve a certain response time the receiver may need to be operated regularly. For devices with ultra-low power consumption, the power consumption of such a regularly operated receiver needs to be low.

An ultra-low power receiver specifically dedicated for this purpose (a so-called wake-up receiver—WUR) is often used to meet the above requirements. The capabilities of the wake-up receiver are limited, and it typically is only able to detect presence of a wake-up signal (WUS) and initiate operation of a main receiver responsive to wake-up signal detection. The main receiver is typically a receiver with more capabilities (i.e., able to receive the actual communication) and higher power consumption.

Typically, a wake-up signal (WUS) may be defined as a signal with the (possibly sole) purpose of being reliably detected by a wake-up receiver (WUR) for causing the WUR to wake-up a more advanced (e.g., default/main) receiver in the device comprising the WUR.

One obstacle when implementing a WUR is that accurate generation of local oscillator (LO) signals typically entails high power consumption. Therefore, on-off keying (OOK) is typically used for the WUS, which enables use of amplitude detection in the WUR—thereby avoiding the need for an accurate LO signal.

However, if the LO signal of the WUR is not very accurate, only modest filtering can be used to not risk that the WUS falls outside of the passband of the filter. Consequently, the vulnerability to interference, and particularly the vulnerability to interference in adjacent frequencies, is higher than it would have been if more precise filtering was applied.

Therefore, there is a need for alternative approaches to wake-up signal transmission and reception. Preferably, such approaches provide for improved immunity to interference—i.e., decreased vulnerability to interference—compared to prior art approaches, while the power consumption of the WUR is lower than if an accurate LO signal was to be used therein.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for a wake-up transmitter. The method comprises generating a wake-up signal (WUS) from a digital WUS sequence having an information symbol rate and a corresponding information symbol bandwidth, and transmitting the WUS over a frequency range having a signal bandwidth, wherein the signal bandwidth is larger than twice the information symbol rate, and wherein any frequency interval comprised in the frequency range conveys the digital WUS sequence when a width of the frequency interval is at least the information symbol bandwidth.

In some embodiments, generating the WUS comprises modulating the digital WUS sequence on two or more carrier frequencies comprised in the frequency range.

In some embodiments, the two or more carrier frequencies are equidistantly separated in frequency by a carrier frequency interval.

In some embodiments, the carrier frequency interval equals twice the information symbol rate.

In some embodiments, each of a lowest one of the carrier frequencies and a highest one of the carrier frequencies is separated by half the carrier frequency interval from a respective edge of the frequency range.

In some embodiments, generating the WUS comprises modulating the digital WUS sequence on a single carrier frequency comprised in the frequency range.

In some embodiments, the single carrier frequency is a center frequency of the frequency range.

In some embodiments, modulating the digital WUS sequence on a single carrier frequency comprises feeding the digital WUS sequence to respective inputs of an orthogonal frequency division multiplex, OFDM, signal generator.

In some embodiments, the method further comprises transmitting two or more pilot signals within the frequency range for frequency synchronization, wherein any frequency interval comprised in the frequency range comprises at least one pilot signal when the width of the frequency interval is at least the information symbol bandwidth.

In some embodiments, any frequency interval comprised in the frequency range comprises exactly one pilot signal when the width of the frequency interval equals the information symbol bandwidth.

In some embodiments, the two or more pilot signals are equidistantly separated in frequency by a pilot frequency interval.

In some embodiments, the pilot frequency interval equals twice the information symbol rate.

In some embodiments, each of the pilot signals is transmitted on a respective one of the carrier frequencies.

In some embodiments, transmitting the two or more pilot signals comprises one or more of: transmitting the two or more pilot signals separately from the WUS in a time domain, transmitting the two or more pilot signals simultaneously with the WUS in the time domain, and transmitting the two or more pilot signals during a part of the WUS in the time domain.

A second aspect is a method for a wake-up receiver (WUR). The method comprises receiving a wake-up signal (WUS) over a frequency range having a signal bandwidth, wherein any frequency interval comprised in the frequency range conveys a digital WUS sequence having an information symbol rate and a corresponding information symbol bandwidth when a width of the frequency interval is at least the information symbol bandwidth, and wherein the signal bandwidth is larger than twice the information symbol rate, and filtering the received WUS through a filter having a filter bandwidth for passing the information symbol bandwidth of the received WUS.

In some embodiments, the method further comprises down-converting the received WUS to a baseband WUS, wherein filtering the received WUS comprises filtering the baseband WUS, and wherein the filter bandwidth is for passing the information symbol bandwidth of the baseband WUS, or down-converting the received WUS to an intermediate frequency WUS, wherein filtering the received WUS comprises filtering the intermediate frequency WUS, and wherein the filter bandwidth is for passing the information symbol bandwidth of the intermediate frequency WUS.

In some embodiments, the method further comprises converting the filtered WUS from analog domain to digital domain using a sampling rate that corresponds to the information symbol rate.

In some embodiments, the method further comprises receiving two or more pilot signals within the frequency range, filtering the received pilot signals through the filter having the filter bandwidth for passing the information symbol bandwidth of the received WUS, detecting one of the received pilot signals passed by the filter, and frequency synchronizing the filtered WUS based on the detected pilot signal.

In some embodiments, the method further comprises demodulating the filtered WUS to extract the digital WUS sequence, determining whether the extracted digital WUS sequence corresponds to a digital WUS sequence associated with a main receiver, wherein the main receiver is associated with the WUR, and waking up the main receiver associated with the WUR when it is determined that the extracted digital WUS sequence corresponds to the digital WUS sequence associated with the main receiver.

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is an apparatus for a wake-up transmitter. The apparatus comprises controlling circuitry configured to cause generation of a wake-up signal (WUS) from a digital WUS sequence having an information symbol rate and a corresponding information symbol bandwidth, and transmission of the WUS over a frequency range having a signal bandwidth, wherein the signal bandwidth is larger than twice the information symbol rate, and wherein any frequency interval comprised in the frequency range conveys the digital WUS sequence when a width of the frequency interval is at least the information symbol bandwidth.

A fifth aspect is a wake-up transmitter comprising the apparatus of the fourth aspect.

A sixth aspect is an apparatus for a wake-up receiver (WUR). The apparatus comprises controlling circuitry configured to cause reception of a wake-up signal (WUS) over a frequency range having a signal bandwidth, wherein any frequency interval comprised in the frequency range conveys a digital WUS sequence having an information symbol rate and a corresponding information symbol bandwidth when a width of the frequency interval is at least the information symbol bandwidth, and wherein the signal bandwidth is larger than twice the information symbol rate, and filtering of the received WUS through a filter having a filter bandwidth for passing the information symbol bandwidth of the received WUS.

A seventh aspect is a wake-up receiver comprising the apparatus of the sixth aspect.

An eighth aspect is a communication device comprising one or more of: the apparatus of the fourth aspect, the wake-up transmitter of the fifth aspect, the apparatus of the sixth aspect, and the wake-up receiver of the seventh aspect.

In some embodiments, any of the above aspects may additionally have features identical with or corresponding to any of the various features as explained above for any of the other aspects.

An advantage of some embodiments is that alternative approaches to wake-up signal transmission and reception are provided.

Another advantage of some embodiments is that improved immunity (decreased vulnerability) to interference is provided for.

Yet an advantage of some embodiments is that low power consumption of the wake-up receiver is enabled.

Yet another advantage of some embodiments is that use of other modulation forms than on-off keying (OOK) is enabled for the WUS.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/ including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, implementing a WUR typically entails trading off low power consumption against high immunity to interference. When interference is referred to herein it is meant to include any disturbance as applicable in the situation at hand.

A lowered power consumption typically leads to a less accurate LO frequency, requiring a wide filter to not risk missing part of the WUS, which in turn leads to that more interference power can remain after the filtering. Any interference not removed by the filter may be detrimental to the WUS detection (e.g., amplitude detection); including interference overlapping the WUS in the frequency domain and/or interference in adjacent or other nearby frequency intervals.

Furthermore, an amplitude detector is typically highly non-linear in that it produces very weak output signals for weak input signals. Assuming that an amplitude detector has a quadratic characteristic for weak signals, the signal-to-interference ratio falls off by 20 dB for each reduction of 10 dB of the input signal. This phenomenon quickly becomes very unfavourable even with modest interference in the input signal of the amplitude detector since the interference will limit how much the input signal can be amplified.

Thus, due to limited filtering prior to amplitude detection wakeup receivers are typically very vulnerable to interference.

Therefore, there is a need for alternative approaches to wake-up signal transmission and reception. Preferably, such approaches should provide for decreased vulnerability to interference while keeping the power consumption of the WUR at a low level.

In the following, embodiments will be described where a wake-up signal allows for narrow filtering (i.e., improved interference resistance) without requiring an accurate frequency reference at the wake-up receiver (i.e., without markedly increasing the power consumption).

Figure 1:
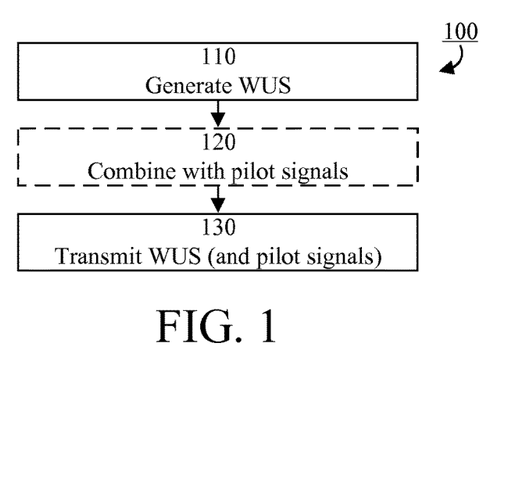
FIG. 1 is a flowchart illustrating example method steps according to some embodiments.
Figure 2:
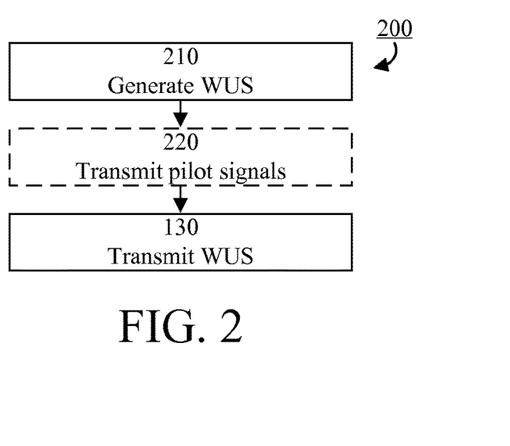
FIG. 2 is a flowchart illustrating example method steps according to some embodiments.

FIGS. 1 and 2 illustrate example methods 100 and 200 for a wake-up transmitter according to some embodiments.

In steps 110 and 210, a wake-up signal (WUS) is generated and, in steps 130 and 230, the WUS is transmitted over a frequency range having a signal bandwidth. The WUS is generated from a digital WUS sequence having an information symbol rate and a corresponding information symbol bandwidth. The information symbols may be information bits or higher order symbols, as applicable.

For an unmodulated WUS sequence, the information symbol bandwidth typically corresponds to the information symbol rate. For a modulated WUS sequence, the information symbol bandwidth may typically correspond to twice the information symbol rate.

Generally, the WUS is generated with the property that any frequency interval comprised in the frequency range conveys the digital WUS sequence when a width of the frequency interval is at least the information symbol bandwidth (refer to the Nyquist theorem). Such a property may be achieved in any suitable way, and two examples are given in the following.

Also generally, the signal bandwidth of the frequency range is larger than twice the information symbol rate. Typically, the signal bandwidth is much larger than twice the information symbol rate. For example, the signal bandwidth may be substantially equal the information symbol rate multiplied by a positive even integer larger than two; such as four, six, eight, ten, twelve, etc.

In one example, the generation of the WUS in steps 110 and 210 may comprise modulating the digital WUS sequence on two or more (e.g., two, three, four, five, etc.; or two, four, eight, sixteen, etc., as applicable) carrier frequencies comprised in the frequency range. The two or more carrier frequencies may typically be equidistantly separated in frequency by a carrier frequency interval. The carrier frequency interval typically equals twice the information symbol rate. Also, typically, the lowest and highest ones of the carrier frequencies are separated by half the carrier frequency interval from a respective edge of the frequency range.

In one example, the generation of the WUS in steps 110 and 210 may comprise modulating the digital WUS sequence on a single carrier frequency comprised in the frequency range. The single carrier frequency may typically be a center frequency of the frequency range. For example, modulating the digital WUS sequence on a single carrier frequency may be achieved by feeding the digital WUS sequence to respective inputs of an orthogonal frequency division multiplex (OFDM) signal generator.

In any case, some embodiments may further comprise transmitting two or more pilot signals (e.g., two or more single-frequency tones) within the frequency range for frequency synchronization. Generally, the pilot signals are transmitted with the property that any frequency interval comprised in the frequency range comprises at least one (e.g., exactly one) pilot signal when the width of the frequency interval is at least the information symbol bandwidth.

Typically, the two or more pilot signals may be equidistantly separated in frequency by a pilot frequency interval, and the pilot frequency interval may typically equal twice information symbol rate.

The number of pilot signals may, for example, correspond to the number of carrier frequencies in the example with two or more carrier frequencies. Then, each of the pilot signals may be transmitted on a respective one of the carrier frequencies, for example.

In the example method 100, optional step 120 illustrates that the WUS may be combined with pilot signals, and the WUS and the pilot signals may be transmitted simultaneously in step 130.

In the example method 200, optional step 220 illustrates that pilot signals may be transmitted separately from (e.g., before) the WUS transmission of step 130.

Generally, the two or more pilot signals may be transmitted according to one or more of the following: separately from the WUS in the time domain, separately from the WUS in the frequency domain, simultaneously with the WUS in the time domain, separately from the WUS in the frequency domain, partly or fully overlapping with the WUS in the time domain (e.g., during a part of the WUS, such as an initial part of the WUS), and partly or fully overlapping with the WUS in the frequency domain.

Figure 3:
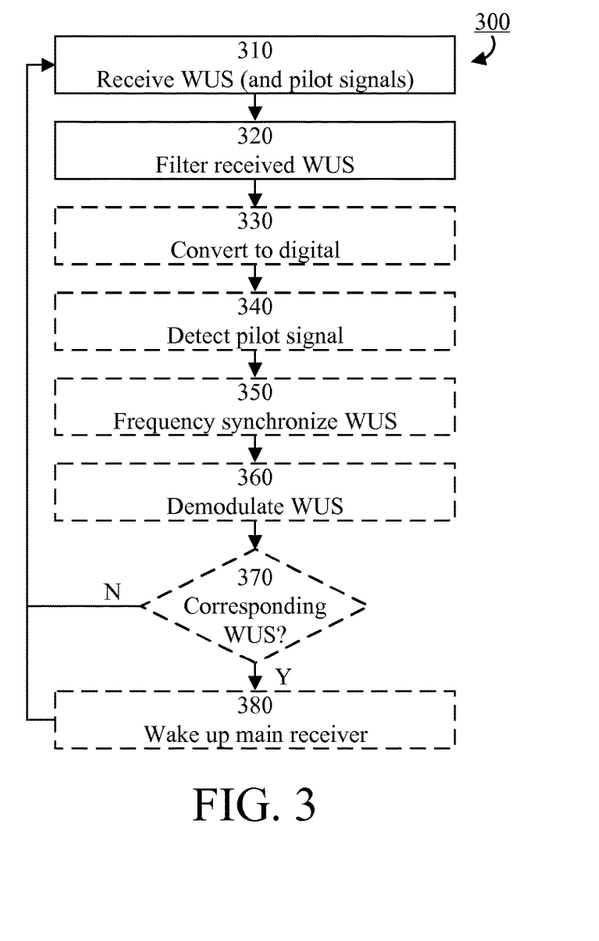
FIG. 3 is a flowchart illustrating example method steps according to some embodiments.

FIG. 3 illustrates an example method 300 for a wake-up receiver (WUR) according to some embodiments. The method 300 is particularly suitable to be used for reception of a WUS having the property that any frequency interval comprised in a received frequency range having a signal bandwidth conveys a digital WUS sequence having an information symbol rate and a corresponding information symbol bandwidth when a width of the frequency interval is at least the information symbol bandwidth, wherein the signal bandwidth is larger than twice the information symbol rate; e.g., a WUS transmitted according to any of the example methods 100 of FIG. 1 and 200 of FIG. 2.

In step 310, a wake-up signal (WUS) is received over a frequency range having a signal bandwidth and, in step 320, the received WUS is filtered through a filter having a filter bandwidth for passing the information symbol bandwidth of the received WUS. Thus, when the received WUS has the above-defined property the filtered WUS will comprise the information of the digital WUS sequence.

The filter bandwidth is generally suitable for passing the information symbol bandwidth of the WUS. In various examples, the filter bandwidth may be equal, or substantially equal, to the information symbol bandwidth or may be wider than the information symbol bandwidth. The filter bandwidth typically equals a bandwidth which is at least the information symbol bandwidth of the WUS.

If applicable, the received WUS is typically directly down-converted to a baseband WUS. When at least part of the down-conversion is applied after filtering, the filter for passing the information symbol bandwidth may be a bandpass filter with a filter bandwidth equal, or substantially equal, to twice the information symbol rate. When down-conversion is applied before filtering (i.e., when filtering the received WUS comprises filtering the baseband WUS) and the filter bandwidth is for passing the information symbol bandwidth of the baseband WUS, the filter for passing the information symbol bandwidth may be a low-pass filter (or low-pass filters) with a filter bandwidth equal, or substantially equal, to the information symbol rate.

In optional step 330, the filtered WUS is converted from analog domain to digital domain using a sampling rate that corresponds to the information symbol rate. Using the information symbol rate as sampling rate has the effect that the filtered WUS is folded; e.g., to alleviate effects of finite filter transition bands and/or to mitigate dis-placement of the filter in the frequency domain as will be illustrated further in connection with FIG. 4.

When the transmitted WUS is an OFDM-like signal (e.g., generated using an OFDM signal generator as exemplified above) the filter bandwidth for passing the information symbol bandwidth of the WUS may be equal, or substantially equal, to a multiple of the information symbol bandwidth. Then, using the information symbol rate as sampling rate has the effect that filtered WUS parts associated with different sub-carrier frequencies are folded on top of each other, accumulating information of the digital WUS sequence.

When two or more pilot signals are transmitted in association with the WUS as exemplified above in connection with FIGS. 1 and 2, the example method 300 may further comprise receiving the two or more pilot signals within the frequency range (e.g., simultaneously with the WUS as illustrated by step 310, separately from the WUS, or in any other manner as elaborated on above in connection with FIGS. 1 and 2).

In any case, the received pilot signals may typically be filtered through the filter having the filter bandwidth for passing the information symbol bandwidth of the received WUS, whereby at least one of the pilot signals remains after the filtering.

As illustrated by optional step 340, one of the received pilot signals passed by the filter may be detected. The detection may be according to any suitable approach to extract the pilot signal frequency. Examples include application of a fast Fourier transform (FFT), application of a bank of further (narrow) filters, and application of one further (narrow) filter sweeping over the filter bandwidth for passing the information symbol bandwidth. That the further filters are narrow may be defined as a plurality of bandwidths of the further filters fitting in a non-overlapping manner within the filter bandwidth for passing the information symbol bandwidth.

The detected pilot signal may be used to perform frequency synchronization of the filtered WUS, as illustrated by optional step 350. The frequency synchronization may, for example, be implemented as rotating the digital samples of the filtered WUS in correspondence with a relation between the frequency of the detected pilot signal and an expected reference frequency after down-conversion. When the pilot signals are transmitted on respective ones of two or more carrier frequencies, the frequency synchronization may comprise rotating the digital samples of the filtered WUS in correspondence with a relation (e.g., a difference) between the frequency of the detected pilot signal and an expected carrier center frequency of the WUS after down-conversion. Frequency rotation may, for example, be accomplished by digital mixing with the negative of the frequency difference. Frequency synchronizing the filtered WUS has the effect that a reconstructed copy of the digital WUS sequence is provided, thereby mitigating a frequency offset of the down-conversion as will be illustrated further in connection with FIG. 4. Generally, when reconstruction of an original signal is referred to herein, it should be understood that the reconstruction may include effects of disturbances and may not be an exact copy of the original signal.

The frequency synchronization, provided for via the pilot signals, enables use of other modulation forms than on-off keying (OOK) for the WUS; e.g., phase shift keying (PSK) or frequency shift keying (FSK).

As illustrated by optional steps 360 and 370, the filtered WUS (possibly after frequency synchronization, when applicable) may be demodulated to extract the digital WUS sequence, and it may be determined whether the extracted digital WUS sequence corresponds to a digital WUS sequence intended to wake up a main receiver associated with the WUR. If so (Y-path out of step 370), the main receiver associated with the WUR is woken up, as illustrated by optional step 380. If not (N-path out of step 370), no action is taken for the received WUS.

It should be noted that the two or more pilots may not be necessary for proper transmission and/or reception of the WUS. For example, if OOK is used, the WUS can be handled by the WUR without frequency synchronization based on a detected pilot signal.

If pilot signals are used, part of the transmitted power would be allocated to the pilot signals rather than to the WUS information itself, which may lead to that the performance may be somewhat degraded. In one mitigation approach, the pilot signals are only present during a part of the WUS (e.g., an initial part of a WUS packet, such as a syncword transmitted in the beginning of a WUS packet for time and frequency estimation). Such an approach may be particularly suitable when the amount of frequency drift during a WUS packet is low since it may be cumbersome to track changes in the frequency offset between the transmitter and the receiver during a WUS packet for this approach.

Figure 4:
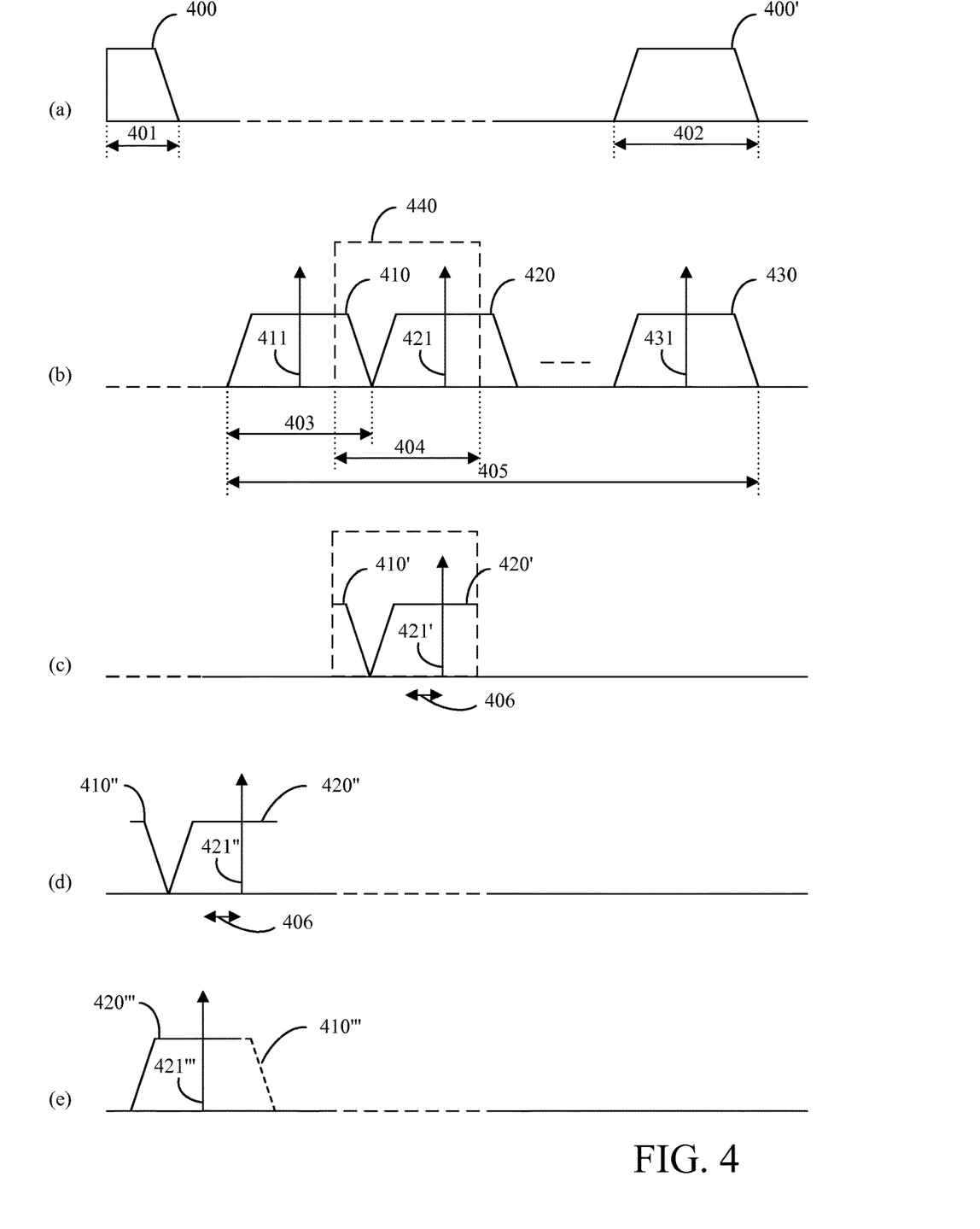
FIG. 4 is a schematic drawing illustrating example frequency domain signals according to some embodiments

FIG. 4 schematically illustrates example frequency domain signals according to some embodiments.

Part (a) illustrates frequency domain representations 400, 400' of a digital WUS sequence that has an information symbol rate 401. An unmodulated (baseband) WUS sequence is represented by 400, and has an information symbol bandwidth 401 which corresponds to the information symbol rate 401. A modulated (non-baseband) WUS sequence is represented by 400', and has an information symbol bandwidth 402 which corresponds to twice the information symbol rate 401.

Part (b) illustrates a WUS generated from the digital WUS sequence. In this example, the WUS is composed of a plurality of copies 410, 420, 430 of the modulated WUS sequence 400', each copy transmitted at respective different carrier frequencies, wherein the carrier frequencies are equidistantly separated in frequency by a carrier frequency interval which equals the information symbol bandwidth 402 of the modulated WUS sequence (i.e., twice the information symbol rate).

The WUS of part (b) has a signal bandwidth 405, and it can be seen that any frequency interval 403, 404 whose width equals the information symbol bandwidth 402 conveys the digital WUS sequence (either as an intact one of the copies 410, 420, 430, or by aggregation of respective parts of two copies).

Part (b) also illustrates pilot signals 411, 421, 431 located at the different carrier frequencies, and it can be seen that any frequency interval 403, 404 whose width equals the information symbol bandwidth 402 comprises exactly one pilot signal.

If a filter 440 with a filter bandwidth that equals the information symbol bandwidth 402 is applied by a WUR to the signal of part (b), the resulting filtered signal may be schematically represented as in part (c), where the filtered signal is represented by aggregation of respective parts, 410' and 420', of copies 410 and 420 of the modulated WUS sequence, and a pilot signal 421' de-centered by a frequency offset illustrated by 406.

It should be noted that, in practice, the channel filter will typically not have the brick-wall characteristic as illustrated in FIG. 4, but may instead have a transition band. Signals close to the edges of the filter (at equal distance from the opposite sides of opposite edges) carry the same information and will end up at the same frequency after the folding process (see parts (d) and (e)). The phase and amplitude response of the filter may be important to achieve a smooth frequency response when the signals are added in the folding process. The situation resembles the design of cross-over filters in loudspeakers, where it has been found that a third order Butterworth filter should be a good choice to obtain good phase and amplitude response as well as a steep roll-off.

Part (d) schematically illustrates the filtered signal of part (c) after down-conversion to intermediate frequency and conversion from analog domain to digital domain using a sampling rate that corresponds to the information symbol rate, wherein the signal is represented by 410" and 420" corresponding to 410' and 420' of part (c), and the de-centered pilot signal is represented by 421".

By rotating the digital samples of the filtered WUS in correspondence with the difference 406 between the frequency of the pilot signal 421" and an expected center frequency of the WUS after down-conversion, the received signal is properly placed in frequency (mitigating a frequency offset of the down-conversion) as illustrated by 421'" in part (e). The filtered signal of part (c) is folded such that the mutual placement of parts 410' and 420' is reversed to reconstruct the frequency spectrum of the modulated WUS sequence copy 420 (or 410) as illustrated by 410'" and 420'" in part (e).

Figure 5:
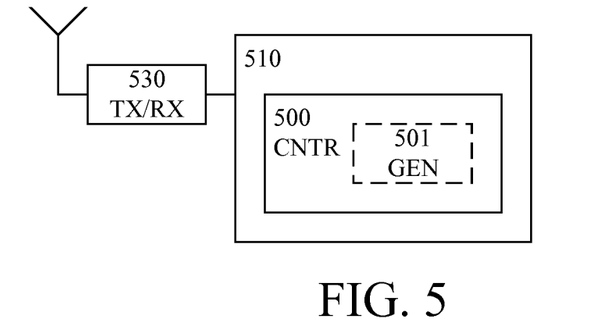
FIG. 5 is a schematic block diagram illustrating an example apparatus according to some embodiments.

FIG. 5 schematically illustrates an example apparatus 510 for a wake-up transmitter according to some embodiments. The apparatus 510 may, for example, be comprised in a wake-up transmitter of a communication device. The apparatus 510 may, for example, be configured to execute, or cause execution of, one or more of the method steps described in connection with any of FIGS. 1 and 2.

The apparatus 510 comprises a controller (CNTR; e.g., controlling circuitry or a controlling module) 500.

The controller 500 is configured to cause (e.g., configured to perform) generation of a wake-up signal, WUS, from a digital WUS sequence having an information symbol rate and a corresponding information symbol bandwidth (compare with step 110 of FIG. 1 and step 210 of FIG. 2) for transmission over a frequency range having a signal bandwidth, wherein the signal bandwidth is larger than twice the information symbol rate.

To this end, the controller 500 may comprise, or be otherwise associated with, a WUS generator (GEN; e.g., WUS generation circuitry or a WUS generation module) 501. The WUS generator may be configured to generate the WUS from a digital WUS sequence having an information symbol rate and a corresponding information symbol bandwidth.

The controller 500 is also configured to cause (e.g., configured to perform) transmission of the WUS over the frequency range having the signal bandwidth, wherein any frequency interval comprised in the frequency range conveys the digital WUS sequence when a width of the frequency interval is at least the information symbol bandwidth (compare with step 130 of FIG. 1 and step 230 of FIG. 2).

To this end, the controller 500 may comprise, or be otherwise associated with, a transmitter (TX; e.g., transmission circuitry or a transmission module); illustrated in FIG. 5 as part of a transceiver (TX/RX) 530. The transmitter may be configured to transmit the WUS over the frequency range having the signal bandwidth.

In some embodiments, the controller 500 is further configured to cause transmission of two or more pilot signals within the frequency range for frequency synchronization (compare with steps 120 and 130 of FIG. 1 and step 220 of FIG. 2).

Figure 6A:
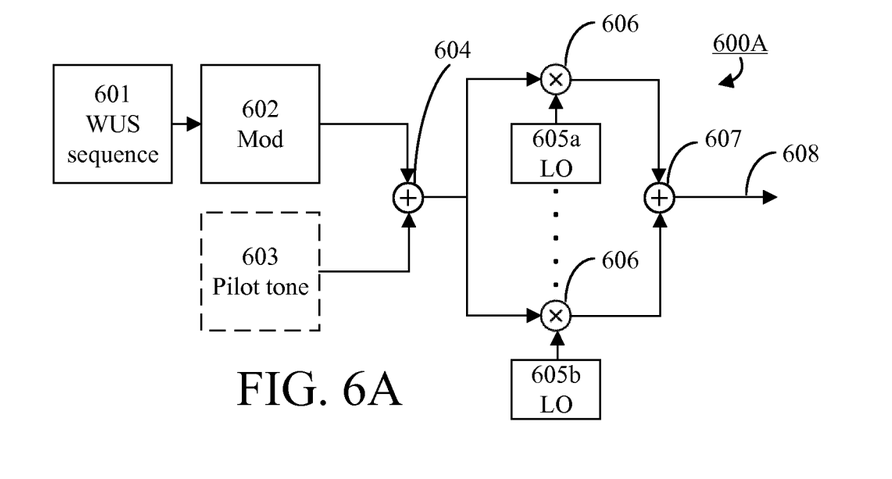
FIG. 6A is a schematic block diagram illustrating an example WUS generator according to some embodiments.

FIG. 6A schematically illustrates an example WUS generator 600A according to some embodiments. The WUS generator 600A may, for example, be used as the WUS generator 501 of FIG. 5.

The example WUS generator 600A is configured to cause generation of the WUS by causing modulation of the digital WUS sequence on two or more carrier frequencies comprised in the frequency range. It should be understood that such a WUS may be generated in numerous other ways and that FIG. 6A merely represents an example implementation of a WUS generator.

The WUS generator 600A comprises a modulator (Mod; e.g., modulating circuitry or a modulation module) 602, a plurality of mixers (e.g., mixing circuitry or mixing modules) 606, and an adder (e.g., adding circuitry or an addition module) 607. Each of the mixers 606 has a corresponding associated local oscillator (LO; local oscillator circuitry or a local oscillator module) 605a, 605b with a frequency that corresponds to a respective carrier frequency. When applicable, the mixers 606 may be quadrature mixers using quadrature LO signals and input signals.

The digital WUS sequence 601 is modulated onto respective carrier frequencies by the combined effect of the modulator 602 and the mixers 606, and combined into a single WUS 608 by the adder 607.

In some embodiments, a pilot tone 603 is added to the modulated WUS by an adder (e.g., adding circuitry or an addition module) 604 before application of the mixers 606.

Figure 6B:
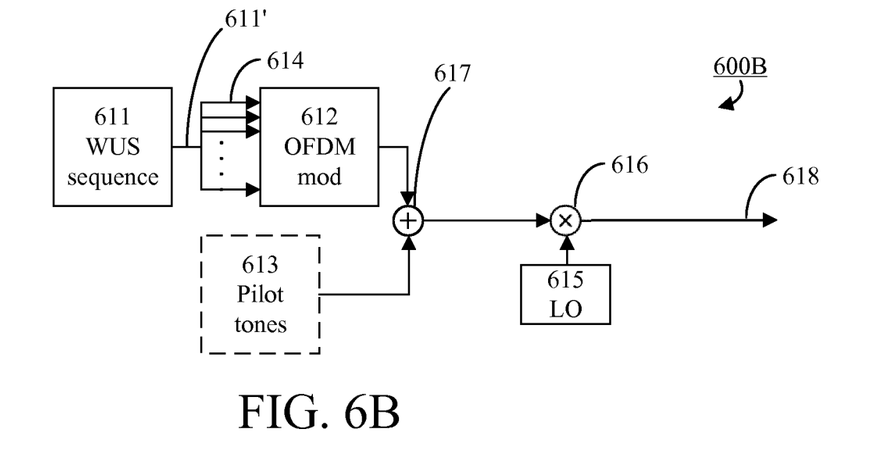
FIG. 6B is a schematic block diagram illustrating an example WUS generator according to some embodiments.

FIG. 6B schematically illustrates an example WUS generator 600B according to some embodiments. The WUS generator 600B may, for example, be used as the WUS generator 501 of FIG. 5.

The example WUS generator 600B is configured to cause generation of the WUS by causing modulation of the digital WUS sequence on a single carrier frequency comprised in the frequency range. It should be understood that such a WUS may be generated in numerous other ways and that FIG. 6B merely represents an example implementation of a WUS generator.

The WUS generator 600B comprises an OFDM modulator (OFDM mod; e.g., OFDM modulating circuitry or an OFDM modulation module) 612, and a mixer (e.g., mixing circuitry or mixing modules) 616 having an associated local oscillator (LO; local oscillator circuitry or a local oscillator module) 615 with a frequency that corresponds to the carrier frequency. When applicable, the mixer 616 may be a quadrature mixer using quadrature LO and input signals.

To provide the WUS 618, the digital WUS sequence 611, in the form of the digital signal 611' is modulated onto the single carrier frequency by the combined effect of feeding the WUS sequence to respective inputs 614 of the OFDM modulator 612 and application of the mixer 616.

In some embodiments, two or more pilot tones 613 are added to the OFDM modulated WUS by an adder (e.g., adding circuitry or an addition module) 617 before application of the mixer 616.

Alternatively, two or more pilot tones 613 may be provided at the inputs 614 of the OFDM-modulator 612 rather than by using an adder 617 after the OFDM-modulator 612. For example, this may be achieved by letting some of the OFDM sub-carriers be used for the pilot tones (multiplexing pilots to some of the inputs 614 of the OFDM-modulator), or by adding the pilot tones to the signal 611'.

Figure 7:
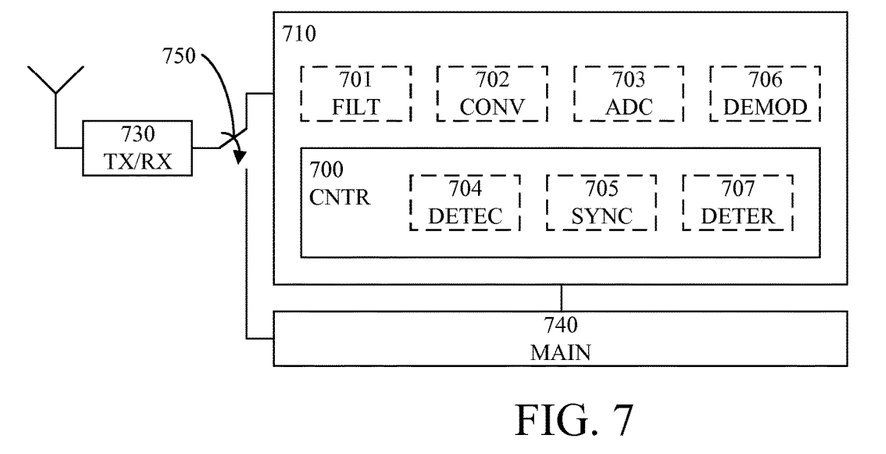
FIG. 7 is a schematic block diagram illustrating an example apparatus according to some embodiments.

FIG. 7 schematically illustrates an example apparatus 710 for a wake-up receiver according to some embodiments. The apparatus 710 may, for example, be comprised in a wake-up receiver of a communication device. The apparatus 710 may, for example, be configured to execute, or cause execution of, one or more of the method steps described in connection with FIG. 3.

The apparatus 710 comprises a controller (CNTR; e.g., controlling circuitry or a controlling module) 700.

The controller 700 is configured to cause (e.g., configured to perform) reception of a wake-up signal, and possibly two or more pilot signals, over a frequency range having a signal bandwidth (compare with step 310 of FIG. 3).

To this end, the controller 700 may comprise, or be otherwise associated with, a receiver (RX; e.g., reception circuitry or a reception module); illustrated in FIG. 7 as part of a transceiver (TX/RX) 730. The receiver may be configured to receive the WUS over the frequency range having the signal bandwidth.

The controller 700 is also configured to cause (e.g., configured to perform) filtering of the received WUS through a filter having a filter bandwidth for passing the information symbol bandwidth of the received WUS (compare with step 320 of FIG. 3).

To this end, the controller 700 may comprise, or be otherwise associated with, a filter (FILT; e.g., filtering circuitry or a filter module) 701. The filter may have a filter bandwidth for passing the information symbol bandwidth of the received WUS and may be configured to filter the received WUS.

The controller 700 may be further configured to cause (e.g., configured to perform) down-conversion of the received WUS to a baseband WUS (compare with description of FIG. 3).

To this end, the controller 700 may comprise, or be otherwise associated with, a down-converter (CONV; e.g., down-conversion circuitry or a down-conversion module) 702; e.g., a mixer. The down-converter may be configured to down-convert the received WUS to a baseband WUS.

The controller 700 may be further configured to cause (e.g., configured to perform) conversion of the filtered WUS from analog domain to digital domain using a sampling rate that corresponds to the information symbol rate (compare with step 330 of FIG. 3).

To this end, the controller 700 may comprise, or be otherwise associated with, an analog-to-digital converter (ADC; e.g., analog-to-digital conversion circuitry or an analog-to-digital conversion module) 703. The analog-to-digital converter may be configured to convert the filtered WUS from analog domain to digital domain using a sampling rate that corresponds to the information symbol rate.

As elaborated on in connection with FIGS. 3 and 4, using the information symbol rate as sampling rate has the effect that the filtered WUS is folded to alleviate effects of finite filter transition bands and/or to mitigate miss-placement of the filter in frequency.

The controller 700 may be further configured to cause (e.g., configured to perform) detection of one of the received pilot signals passed by the filter and frequency synchronization of the filtered WUS based on the detected pilot signal (compare with steps 340 and 350 of FIG. 3).

To this end, the controller 700 may comprise, or be otherwise associated with, a detector (DETEC; e.g., detecting circuitry or a detection module) 704 and a synchronizer (SYNC; e.g., synchronizing circuitry or a synchronization module) 705. The detector may be configured to detect one of the received pilot signals passed by the filter and the synchronizer may be configured to synchronize the filtered WUS based on the detected pilot signal.

As elaborated on in connection with FIGS. 3 and 4, frequency synchronizing the filtered WUS has the effect that a reconstructed copy of the digital WUS sequence is provided, thereby mitigating a frequency offset of the down-conversion and filtering.

The controller 700 may be further configured to cause (e.g., configured to perform) demodulation of the filtered WUS to extract the digital WUS sequence, determination of whether the extracted digital WUS sequence corresponds to a digital WUS sequence associated with a main receiver which is in turn associated with the WUR, and wake up of a main receiver (MAIN) 740 associated with the WUR when it is determined that the extracted digital WUS sequence corresponds to the digital WUS sequence associated with the main receiver (compare with steps 360, 370 and 380 of FIG. 3).

To this end, the controller 700 may comprise, or be otherwise associated with, a demodulator (DEMOD; e.g., demodulating circuitry or a demodulation module) 706, and a determinator (DETER; e.g., determinating circuitry or a determination module) 707. The demodulator may be configured to demodulate the filtered WUS to extract the digital WUS sequence and the determinator may be configured to determine whether the extracted digital WUS sequence corresponds to a digital WUS sequence associated with the main receiver associated with the WUR.

Waking up the main receiver may be implemented in any suitable way and may, for example, include feeding a received signal to the main receiver (e.g., by properly controlling a switch 750 as illustrated in FIG. 7).

Figure 8:
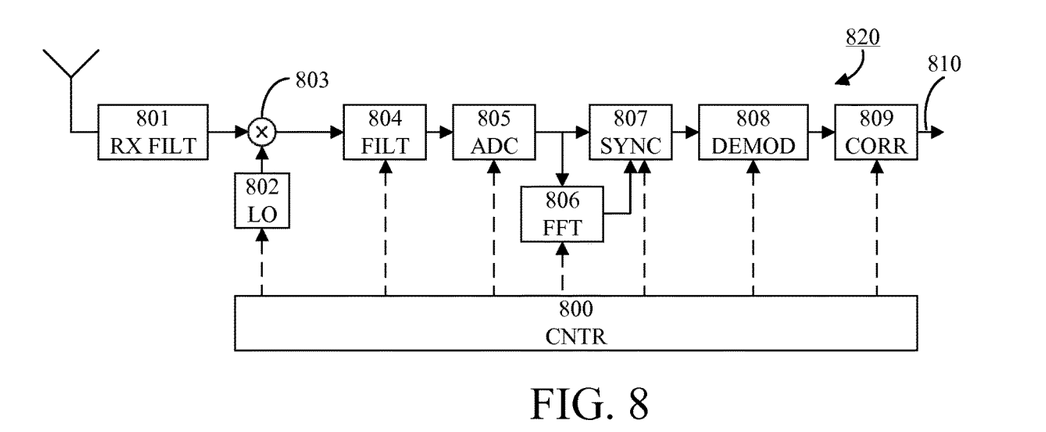
FIG. 8 is a schematic block diagram illustrating an example WUS receiver according to some embodiments.

FIG. 8 schematically illustrates an example arrangement 820 for a wake-up receiver according to some embodiments. The arrangement 820 may, for example, be used in the WUR apparatus 710 of FIG. 7.

The arrangement 820 comprises a receiver filter (RX FILT) 801 configured to filter out the frequency band where the WUS system operates; typically including at least part of a received WUS (compare with 730 of FIG. 7).

The arrangement 820 also comprises a mixer 803, with an associated local oscillator (LO) 802, configured to down-conversion of the received WUS to a baseband WUS (compare with 702 of FIG. 7).

The arrangement 820 also comprises a filter (FILT) 804 having a filter bandwidth for passing the information symbol bandwidth of the received WUS and configured to filter the WUS (compare with 701 of FIG. 7).

The arrangement 820 also comprises an analog-to-digital converter (ADC) 805 configured to conversion of the filtered WUS from analog domain to digital domain using a sampling rate that corresponds to the information symbol rate (compare with 703 of FIG. 7).

The arrangement 820 also comprises a fast Fourier transformer (FFT) 806 configured to detect a received pilot signal passed by the filter 804 (compare with 704 of FIG. 7), and a synchronizer (SYNC) 807 configured to frequency synchronize the filtered WUS based on the detected pilot signal (compare with 705 of FIG. 7).

The arrangement 820 also comprises a demodulator (DE-MOD) 808 configured to demodulate the filtered WUS to extract the digital WUS sequence (compare with 706 of FIG. 7), and a correlator (CORR) 809 configured to determine whether the extracted digital WUS sequence corresponds to a digital WUS sequence associated with a main receiver which is in turn associated with the WUR (compare with 707 of FIG. 7). The output 810 of the correlator may be used for waking up the main receiver associated with the WUR when it is determined that the extracted digital WUS sequence corresponds to the digital WUS sequence associated with the main receiver.

The arrangement 820 also comprises a controller (CNTR) 800 configured to control one or more of the other parts of the arrangement 820 (compare with 700 of FIG. 7).

Even if not shown in FIG. 8, the mixer 803, the filter 804, and the ADC 805 may appear in two instantiations for handling of an in-phase/quadrature (IQ) representation of the received WUS.

Some advantages of various embodiments include:
improved immunity (reduced vulnerability) to interference by using a narrow channel filter in the WUR for high selectivity and sensitivity,
low power consumption of the WUR by using a free running oscillator with low power and uncertain frequency,
low power consumption of the WUR by operating the ADC at the Nyquist rate of the modulated signal,
other modulation forms than on-off keying (OOK) may be used for the WUS.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a communication device, a wake-up transmitter, and/or a wake-up receiver.

Embodiments may appear within an electronic apparatus (such as a communication device, a wake-up transmitter, and/or a wake-up receiver) comprising arrangements, circuitry, and/or logic according to any of the embodiments described herein. Alternatively or additionally, an electronic apparatus (such as a communication device, a wake-up transmitter, and/or a wake-up receiver) may be configured to perform methods according to any of the embodiments described herein.

Figure 9:
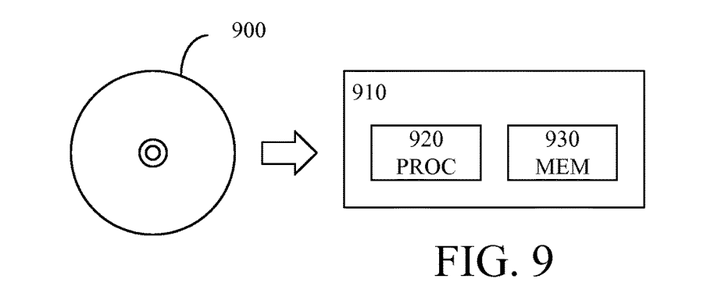
FIG. 9 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 9 illustrates an example computer readable medium in the form of a compact disc (CD) ROM 900. The computer readable medium has stored thereon a computer program comprising program instructions. The computer program is loadable into a data processor (PROC; e.g., data processing circuitry or a data processing unit) 920, which may, for example, be comprised in a communication device (e.g., a wake-up transmitter and/or a wake-up receiver) 910. When loaded into the data processor, the computer program may be stored in a memory (MEM) 930 associated with or comprised in the data processor. According to some embodiments, the computer program may, when loaded into and run by the data processor, cause execution of method steps according to, for example, any of the methods illustrated in FIGS. 1-3 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for a wake-up transmitter, the method comprising:
generating a wake-up signal (WUS) from a digital WUS sequence having an information symbol rate and a corresponding information symbol bandwidth; and
transmitting the WUS over a frequency range having a signal bandwidth, wherein the signal bandwidth is larger than twice the information symbol rate, and wherein any frequency interval comprised in the frequency range conveys the digital WUS sequence when a width of the frequency interval is at least the information symbol bandwidth, wherein
generating the WUS comprises modulating the digital WUS sequence on two or more carrier frequencies comprised in the frequency range,
the two or more carrier frequencies are equidistantly separated in frequency by a carrier frequency interval, and
a lowest one of the carrier frequencies and a highest one of the carrier frequencies of the two or more carrier frequencies is separated by half the carrier frequency interval from a respective edge of the frequency range.

2. The method of claim 1, wherein
the carrier frequency interval equals twice the information symbol rate.

3. The method of claim 1, further comprising transmitting two or more pilot signals within the frequency range for frequency synchronization, wherein
any frequency interval comprised in the frequency range comprises at least one pilot signal when the width of the frequency interval is at least the information symbol bandwidth.

4. The method of claim 3, wherein
any frequency interval comprised in the frequency range comprises exactly one pilot signal when the width of the frequency interval equals the information symbol bandwidth, and
the two or more pilot signals are equidistantly separated in frequency by a pilot frequency interval.

5. The method of claim 4, wherein
the pilot frequency interval equals twice the information symbol rate, and
each of the pilot signals is transmitted on a respective one of the carrier frequencies.

6. The method of claim 4, wherein the pilot frequency interval equals twice the information symbol rate.

7. The method of claim 4, wherein
each of the pilot signals is transmitted on a respective one of the carrier frequencies.

8. The method of claim 3, wherein transmitting the two or more pilot signals comprises one or more of:
transmitting the two or more pilot signals separately from the WUS in a time domain;
transmitting the two or more pilot signals simultaneously with the WUS in the time domain; or
transmitting the two or more pilot signals during a part of the WUS in the time domain.

9. A method for a wake-up receiver (WUR), the method comprising:
receiving a wake-up signal (WUS) over a frequency range having a signal bandwidth, wherein any frequency interval comprised in the frequency range conveys a digital WUS sequence having an information symbol rate and a corresponding information symbol bandwidth when a width of the frequency interval is at least the information symbol bandwidth, and wherein the signal bandwidth is larger than twice the information symbol rate; and
filtering the received WUS through a filter having a filter bandwidth for passing the information symbol bandwidth of the received WUS, wherein
the digital WUS sequence is modulated on two or more carrier frequencies comprised in the frequency range,
the two or more carrier frequencies are equidistantly separated in frequency by a carrier frequency interval, and
a lowest one of the carrier frequencies and a highest one of the carrier frequencies of the two or more carrier frequencies is separated by half the carrier frequency interval from a respective edge of the frequency range.

10. The method of claim 9, further comprising:
down-converting the received WUS to a baseband WUS, wherein filtering the received WUS comprises filtering the baseband WUS, and wherein the filter bandwidth is for passing the information symbol bandwidth of the baseband WUS; or
down-converting the received WUS to an intermediate frequency WUS, wherein filtering the received WUS comprises filtering the intermediate frequency WUS, and wherein the filter bandwidth is for passing the information symbol bandwidth of the intermediate frequency WUS.

11. The method of claim 9, further comprising converting the filtered WUS from analog domain to digital domain using a sampling rate that corresponds to the information symbol rate.

12. The method of claim 9, further comprising:
receiving two or more pilot signals within the frequency range;
filtering the received pilot signals through the filter having the filter bandwidth for passing the information symbol bandwidth of the received WUS;
detecting one of the received pilot signals passed by the filter; and
frequency synchronizing the filtered WUS based on the detected pilot signal.

13. The method of claim 9, further comprising:
demodulating the filtered WUS to extract the digital WUS sequence;
determining whether the extracted digital WUS sequence corresponds to a digital WUS sequence associated with a main receiver, wherein the main receiver is associated with the WUR; and
waking up the main receiver associated with the WUR when it is determined that the extracted digital WUS sequence corresponds to the digital WUS sequence associated with the main receiver.

14. A computer program product comprising a non-transitory computer readable medium, having thereon a computer program comprising program instructions, the computer program being loadable into a data processing unit and configured to cause execution of the method of claim 1 when the computer program is run by the data processing unit.

15. An apparatus for a wake-up transmitter, the apparatus comprising controlling circuitry configured to cause the apparatus to:
  generate a wake-up signal (WUS) from a digital WUS sequence having an information symbol rate and a corresponding information symbol bandwidth; and
  transmit the WUS over a frequency range having a signal bandwidth, wherein the signal bandwidth is larger than twice the information symbol rate, and wherein any frequency interval comprised in the frequency range conveys the digital WUS sequence when a width of the frequency interval is at least the information symbol bandwidth, wherein
  generating the WUS comprises modulating the digital WUS sequence on two or more carrier frequencies comprised in the frequency range,
  the two or more carrier frequencies are equidistantly separated in frequency by a carrier frequency interval, and
  a lowest one of the carrier frequencies and a highest one of the carrier frequencies of the two or more carrier frequencies is separated by half the carrier frequency interval from a respective edge of the frequency range.

16. The apparatus of claim 15, wherein
  the controlling circuitry is further configured to cause transmission of two or more pilot signals within the frequency range for frequency synchronization, wherein any frequency interval comprised in the frequency range comprises at least one pilot signal when the width of the frequency interval is at least the information symbol bandwidth.

17. An apparatus for a wake-up receiver (WUR), the apparatus comprising:
  a receiver for receiving a wake-up signal (WUS) over a frequency range having a signal bandwidth, wherein any frequency interval comprised in the frequency range conveys a digital WUS sequence having an information symbol rate and a corresponding information symbol bandwidth when a width of the frequency interval is at least the information symbol bandwidth, and wherein the signal bandwidth is larger than twice the information symbol rate; and
  a filter for filtering the received WUS, the filter having a filter bandwidth for passing the information symbol bandwidth of the received WUS, wherein
  the digital WUS sequence is modulated on two or more carrier frequencies comprised in the frequency range,
  the two or more carrier frequencies are equidistantly separated in frequency by a carrier frequency interval, and
  a lowest one of the carrier frequencies and a highest one of the carrier frequencies of the two or more carrier frequencies is separated by half the carrier frequency interval from a respective edge of the frequency range.

18. The apparatus of claim 17, wherein the controlling circuitry is further configured to cause:
  down-conversion of the received WUS to a baseband WUS, wherein filtering the received WUS comprises filtering the baseband WUS, and wherein the filter bandwidth is for passing the information symbol bandwidth of the baseband WUS; or
  down-conversion of the received WUS to an intermediate frequency WUS, wherein filtering the received WUS comprises filtering the intermediate frequency WUS, and wherein the filter bandwidth is for passing the information symbol bandwidth of the intermediate frequency WUS.

\* \* \* \* \*